(12) United States Patent
Malin

(10) Patent No.: US 9,096,180 B1
(45) Date of Patent: Aug. 4, 2015

(54) CONTAINER

(71) Applicant: Dan Malin, Bartlett, IL (US)

(72) Inventor: Dan Malin, Bartlett, IL (US)

( * ) Notice: Subject to any disclaimer, the term of this patent is extended or adjusted under 35 U.S.C. 154(b) by 0 days.

(21) Appl. No.: 14/564,317

(22) Filed: Dec. 9, 2014

Related U.S. Application Data

(63) Continuation of application No. 14/262,805, filed on Apr. 28, 2014.

(51) Int. Cl.
  *B60R 9/06* (2006.01)
  *B60R 11/06* (2006.01)

(52) U.S. Cl.
  CPC . *B60R 9/065* (2013.01); *B60R 9/06* (2013.01); *B60R 11/06* (2013.01)

(58) Field of Classification Search
  CPC .................................. B60R 9/065; B60R 11/06
  USPC ............... 224/403, 404; 296/37.6; D12/414.1
  See application file for complete search history.

(56) References Cited

U.S. PATENT DOCUMENTS

| | | | | | |
|---|---|---|---|---|---|
| 3,664,704 | A | * | 5/1972 | Ellis | 296/37.6 |
| 3,727,971 | A | * | 4/1973 | Sisler | 296/37.6 |
| 3,880,458 | A | * | 4/1975 | Jackson | 296/164 |
| 4,705,317 | A | * | 11/1987 | Henri | 296/37.6 |
| 4,938,398 | A | * | 7/1990 | Hallsen | 224/404 |
| 4,971,356 | A | * | 11/1990 | Cook | 280/759 |
| 5,137,322 | A | * | 8/1992 | Muirhead | 296/39.2 |
| 5,154,478 | A | * | 10/1992 | Erickson et al. | 296/39.2 |
| 5,215,205 | A | * | 6/1993 | Behlman | 220/4.31 |
| 5,232,259 | A | * | 8/1993 | Booker | 296/37.6 |
| D352,697 | S | * | 11/1994 | Johnson | D12/414.1 |
| 5,368,210 | A | * | 11/1994 | Wotring | 224/404 |
| 5,494,315 | A | * | 2/1996 | Heltenburg | 280/759 |
| 5,687,895 | A | * | 11/1997 | Allison et al. | 224/542 |
| 5,924,615 | A | * | 7/1999 | McGarrah | 224/404 |
| 6,283,527 | B1 | * | 9/2001 | Desmarais | 296/39.2 |
| 6,302,464 | B1 | * | 10/2001 | Kubis et al. | 296/37.6 |
| 6,325,448 | B1 | * | 12/2001 | Estrada et al. | 296/180.1 |
| 6,340,191 | B1 | | 1/2002 | Brady | |
| 6,349,910 | B1 | | 2/2002 | White | |
| 6,523,877 | B1 | * | 2/2003 | Damian | 296/37.6 |
| 6,641,013 | B2 | * | 11/2003 | Dise | 224/404 |
| 6,742,825 | B1 | * | 6/2004 | Macaulay | 296/37.6 |
| 6,886,876 | B1 | * | 5/2005 | Damian | 296/37.6 |
| 6,932,406 | B2 | | 8/2005 | Waye | |
| 7,055,724 | B2 | * | 6/2006 | Farentinos | 224/404 |
| D590,325 | S | * | 4/2009 | Hall | D12/423 |
| 7,717,486 | B2 | * | 5/2010 | Kokladas | 296/37.6 |
| 7,794,003 | B2 | * | 9/2010 | Crandall | 296/37.6 |

(Continued)

FOREIGN PATENT DOCUMENTS

EP 2030842 A2 3/2009

*Primary Examiner* — Justin Larson
(74) *Attorney, Agent, or Firm* — The Law Firm of Andrea Hence Evans, LLC

(57) ABSTRACT

Certain embodiments of the invention may include a self-securing container to the back of a pickup truck. According to certain embodiments of the present invention, the bottom side of the container may be shaped to be securely mounted on the left or right hump in the bed. According to other embodiments, the present invention may include at least one protruding portion to securely fit a channel guide on the right or left side wall of the bed. According to other embodiments, the present invention may include a tool box that may be secured to the back of the pick-up truck without the use of any additional tools or other structures or fasteners.

24 Claims, 10 Drawing Sheets

(56) References Cited

U.S. PATENT DOCUMENTS

| | | | |
|---|---|---|---|
| 8,281,967 B2 * | 10/2012 | Evans | 224/404 |
| 8,505,998 B1 * | 8/2013 | Weller | 296/39.2 |
| 8,701,950 B2 | 4/2014 | Roach et al. | |
| 8,814,246 B2 * | 8/2014 | Weller | 296/37.6 |
| 8,950,427 B2 * | 2/2015 | Gallo et al. | 137/351 |
| 2001/0050491 A1 | 12/2001 | Clare et al. | |
| 2008/0099520 A1 * | 5/2008 | Mitchell | 224/404 |
| 2008/0309108 A1 | 12/2008 | Henderson et al. | |

* cited by examiner

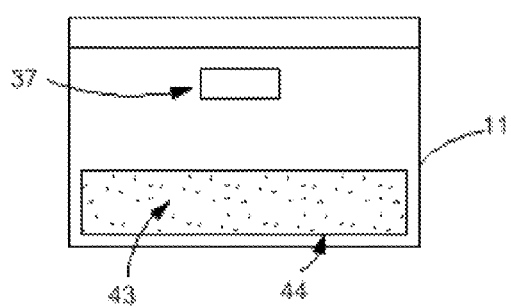
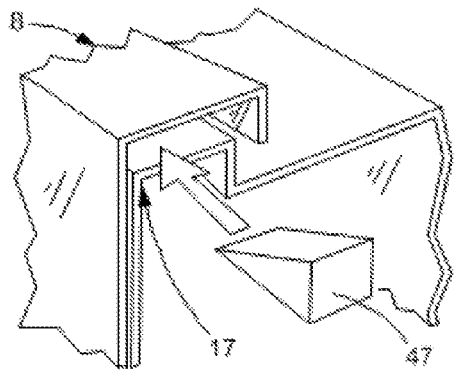
FIG. 14　　　　　FIG. 17
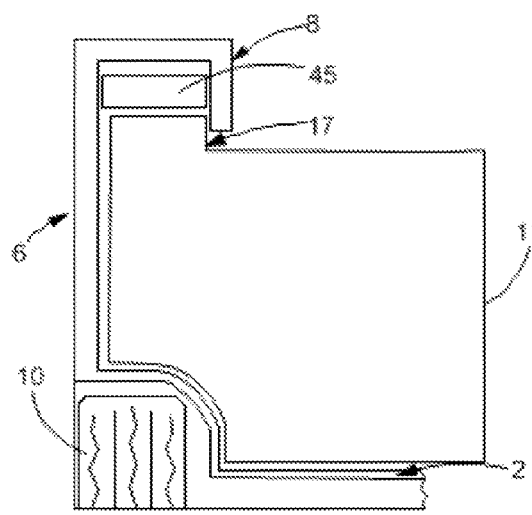
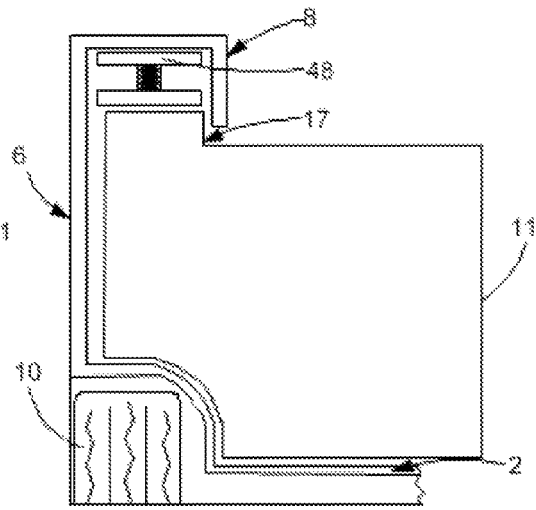
FIG. 15　　　　　FIG. 18
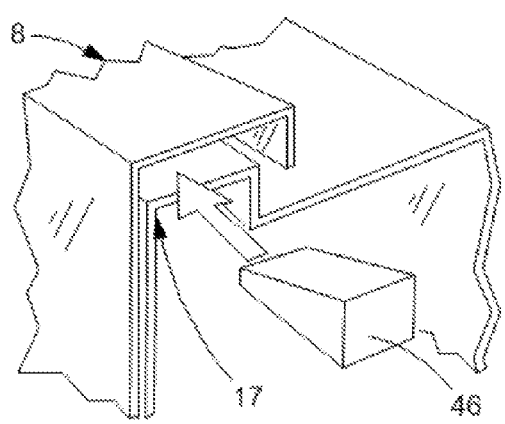
FIG. 16

CONTAINER

PRIORITY CLAIM

This patent application is a Continuation Non-Provisional Patent Application to Non-Provisional application Ser. No. 14/262,805, titled "CONTAINER" filed Apr. 28, 2014, which claims priority to provisional patent application 61/962,600, filed on Nov. 8, 2013. The entire disclosure of the aforementioned patent applications are incorporated by reference as if fully stated herein.

FIELD

The invention relates to a container, which may be adapted to fit the back of a vehicle, such as a pickup truck.

BACKGROUND

Pickup trucks are widely used in many industries to transport commercial goods. They are also used to transport personal items. The commercial goods or personal items are typically stored in containers, or tool boxes, which are secured to flatbed or side walls of the pickup truck by a variety of fasteners and attachments. Many of these fasteners occupy a substantial portion of the area of the flatbed. Regardless of the type of the fasteners or attachment used to secure the container, or tool box, to the flatbed or the side walls, the chances are that some portions of the container would be vibrating and shaking as the pickup truck moves. Furthermore, the goods stored in the container, or tool box, may also be vibrating as the truck is moving. Therefore there is a need for a container, or tool box, that could be securely mounted on the flatbed.

Other systems, methods, aspects, features, embodiments and advantages of the invention disclosed herein will be, or will become, apparent to one having ordinary skill in the art upon examination of the following drawings and detailed description. It is intended that all such additional systems, methods, aspects, features, embodiments and advantages be included within this description, and be within the scope of the accompanying claims. This summary is provided merely to introduce certain concepts and not to identify any key or essential features of the claimed subject matter.

SUMMARY

Some aspects of the invention may include a container adapted to securely attach to the back of a pickup truck. Typically, the back of the pickup truck includes a flatbed that has a left wheel hump and a right wheel hump. The back of the pickup truck also includes a left wall side that has a lip, or channel guide, and a right wall side that has a lip, or channel guide. A tailgate is pivotally attached to the left and right wall sides to allow the user to drop the tailgate to load the back of the pickup truck and thereafter bring up the tailgate to secure the load. Some embodiments of the present invention may include a container that may include a housing. The housing may include a front side, a back side, a left side, a right side, and a bottom side to jointly form a receptacle for receiving things. According to some embodiments of the present invention, the container may be releasably secured into the channel guide. The right side of the container may include a protruding portion that may be adapted to releasably fit within the channel guide.

According to other embodiments of the present invention, the left side of the container may be configured to securely attach to the left wall side without use of additional tools or structures.

According to other embodiments of the present invention, the right side of the container may be configured to securely attach to the right wall side without use of additional tools or structures.

According to other embodiments of the present invention, the bottom side of the container may include a cavity shaped to be securely mounted on either hump.

According to other embodiments of the present invention, the right side of the container or the left side may include at least one fastener to secure the container to the flatbed.

BRIEF DESCRIPTION OF THE DRAWINGS

It is to be understood that the drawings are solely for purpose of illustration. Furthermore, the components in the figures are not necessarily to scale, emphasis instead being placed upon illustrating the principles of the system disclosed herein. In the figures, like reference numerals designate corresponding parts throughout the different views.

FIG. 14 shows a view of an alternative embodiment of the present invention;
FIG. 15 shows a view of an alternative embodiment of the present invention;
FIG. 16 shows a view of an alternative embodiment of the present invention;
FIG. 17 shows a view of an alternative embodiment of the present invention;
FIG. 18 shows a view of an alternative embodiment of the present invention.

DETAILED DESCRIPTION OF PREFERRED EMBODIMENTS

The following detailed description, which references to and incorporates the drawings, describes and illustrates one or more specific embodiments. These embodiments, offered not to limit but only to exemplify and teach, are shown and described in sufficient detail to enable those skilled in the art to practice what is claimed. Thus, for the sake of brevity, the description may omit certain information known to those of skill in the art.

Figure 1:
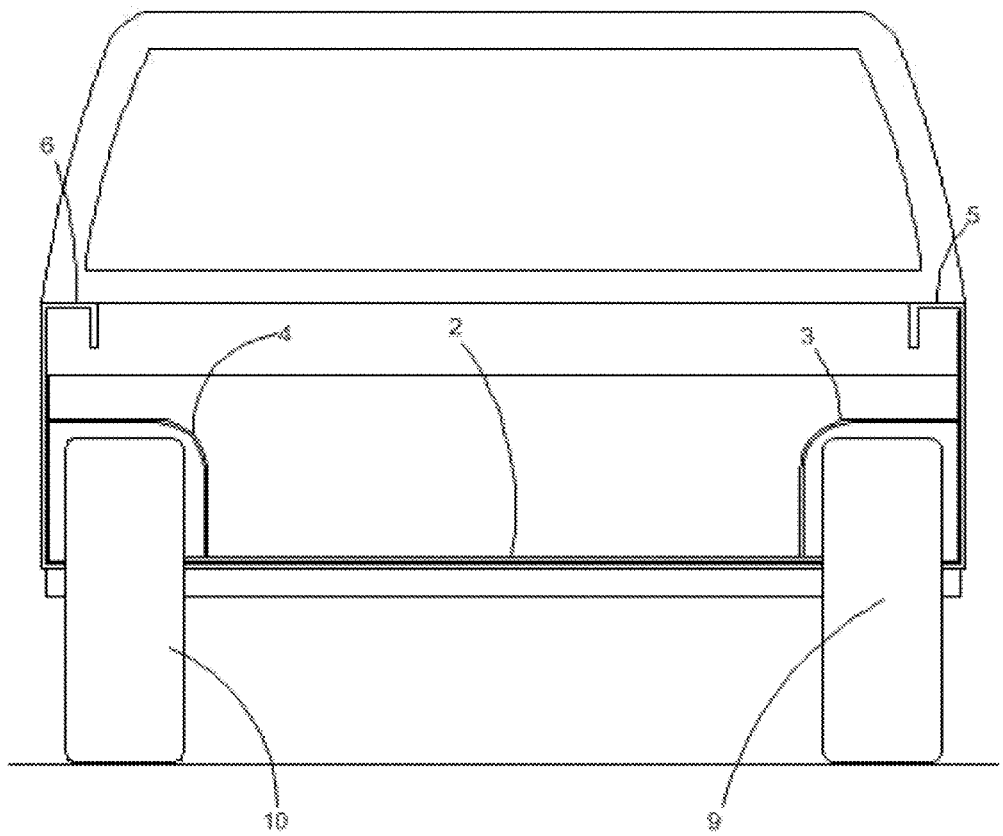
FIG. 1 shows a plain view of the back of a pickup truck.

FIG. 1 shows an isometric view of the back 1 of a conventional pickup truck, which includes a flatbed 2, a right hump 3, a left hump 4, a right side wall 5, a left side wall 6, a right side lip (channel guide) 7, a left side lip (channel guide) 8, a right tire 9, and a left tire 10. Pickup trucks are used in many industries to transport commercial goods. They are also used to transport personal items. The commercial goods or personal items are typically stored in containers or tool boxes, which are secured to flatbed 2 or side walls (5 and 6) of the pickup truck by a variety of fasteners and attachments. Many of these fasteners occupy a substantial portion of the area of flatbed 2. Regardless of the type of the fasteners or attachment used to secure the container or the tool box to flatbed 2 or side walls (5 and 6) the chances are that some portions of the container would be vibrating and shaking as the pickup truck moves. Furthermore, the goods stored in the container, or tool box, may also be vibrating as the truck is moving.

Figure 2:
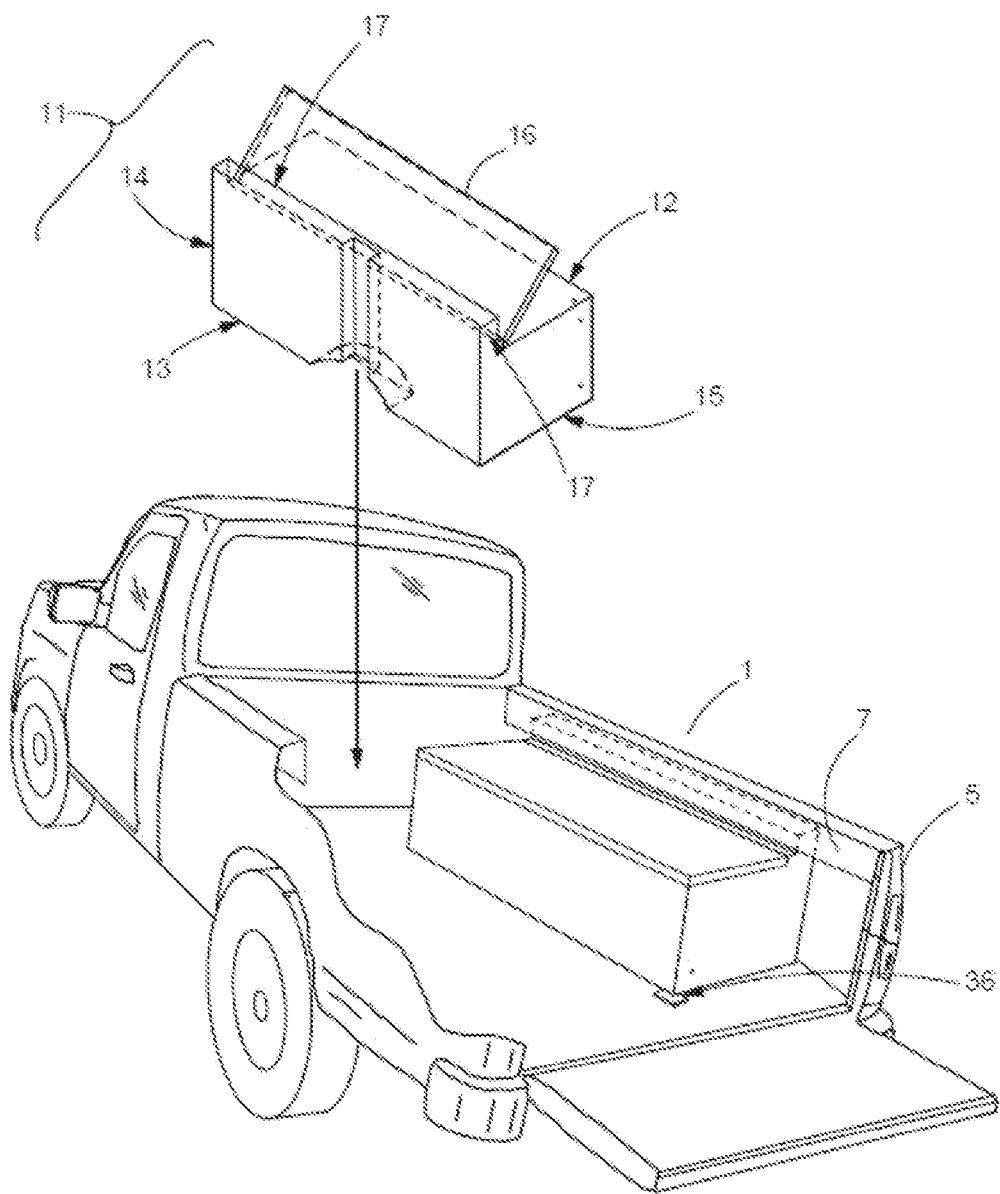
FIG. 2 is an isometric view showing certain embodiments of the present invention.

FIG. 2 shows an embodiment of the present invention as a container 11. Container 11 may have a right side view 12, a left side view 13, a front side view 14, a back side view 15, an upper protrusion portion 17, and a pivoting top cover 16. The "front side view" 14 may be near the back of the truck bed (or flatbed) and "back side view" 15 may be near the front of the truck bed, or vice versa, depending on which side of the truck bed the container 11 is placed. Container 11 may be mounted on top of a hump, not shown, and secured to side wall 5 through engagement of protrusion portion 17 with channel guide (also called a "lip") 7. Container 11 may be mounted on back of pickup truck without additional fasteners or tools to secure container 11 to the back of a pickup truck.

Figure 3:
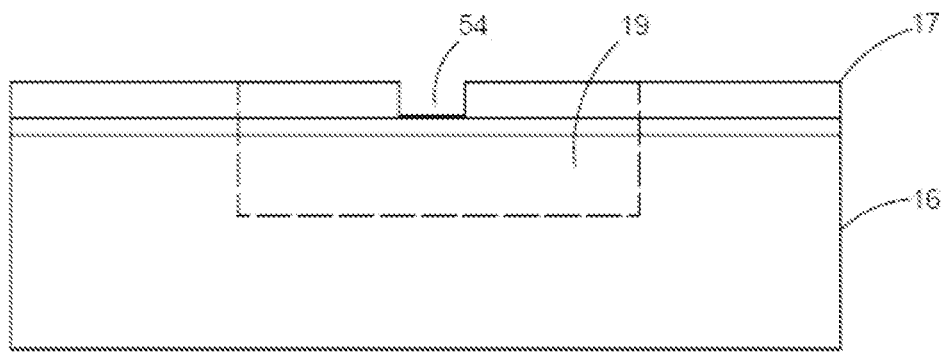
FIG. 3 shows a side view of certain embodiment of the present invention.
Figure 4:
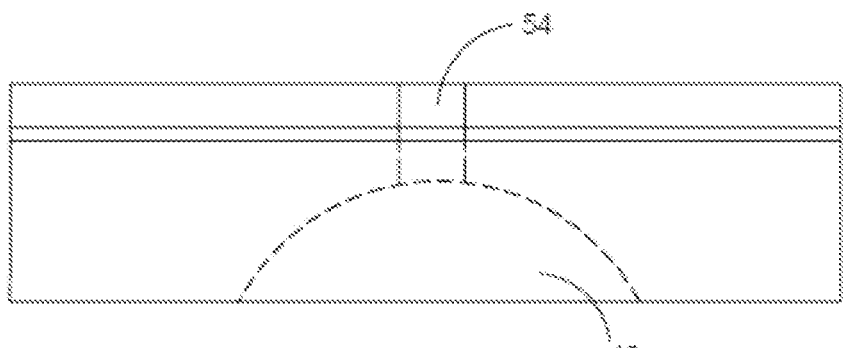
FIG. 4 shows another side view of certain embodiments of the present invention.

FIGS. 3 and 4 show a top view and a side view, respectively, of container 11.

Figure 5:
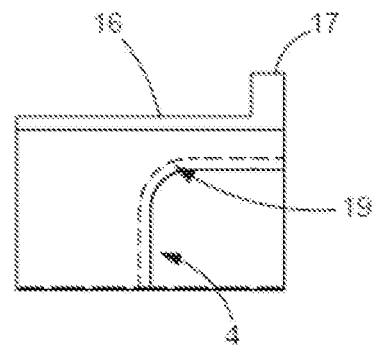
FIG. 5 shows another view of certain embodiments of the present invention.

FIG. 5 shows a side view of container 11 mounted on left hump 4. Container 11 may include a cavity 19 identical, or substantially conforming to, the shape of left 4 or right 5 humps to securely mount container 11 on top of the humps (4 or 5).

Figure 6:
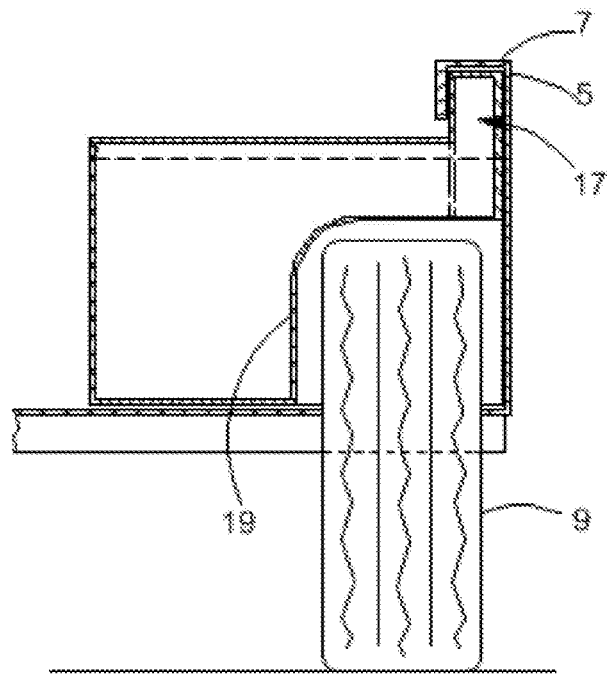
FIG. 6 shows another view of certain embodiments of the present invention mounted on the back of a pickup truck.

FIG. 6 shows a rear cross sectional view of container 11. Container 11 may include protrusion portion 17 that may engage right side lip 7, or left side lip 8, slidably allowing container 11 to securely engage said right side wall 5, or left side wall 6, of the back of pickup truck. Container 11 may also include a hump shaped cavity 19 to receive the right hump 3 or the left hump 4. Container 11 may be self-secured through engagement with side wall (5 or 6) and hump (3 or 4) on the flatbed 2 of a pickup truck.

Figure 7:
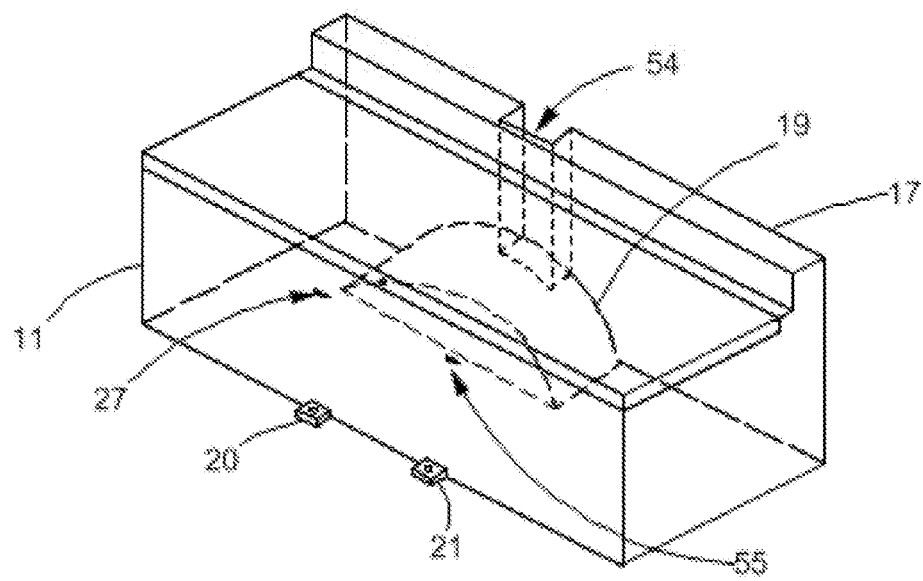
FIG. 7 shows an isometric view of certain embodiments of the present invention.

FIG. 7 shows an isometric view of container 11. Container 11 may include a hump shaped cavity 19 to receive a hump (3 or 4) of the pickup truck. Container 11 may also include protrusion 17 to engage the side walls (5 or 6) of a pickup truck. Container 11 may also include additional fastener or attachments 20 and 21 to provide additional attachment with the flatbed 2 of the pickup truck.

Figure 8:
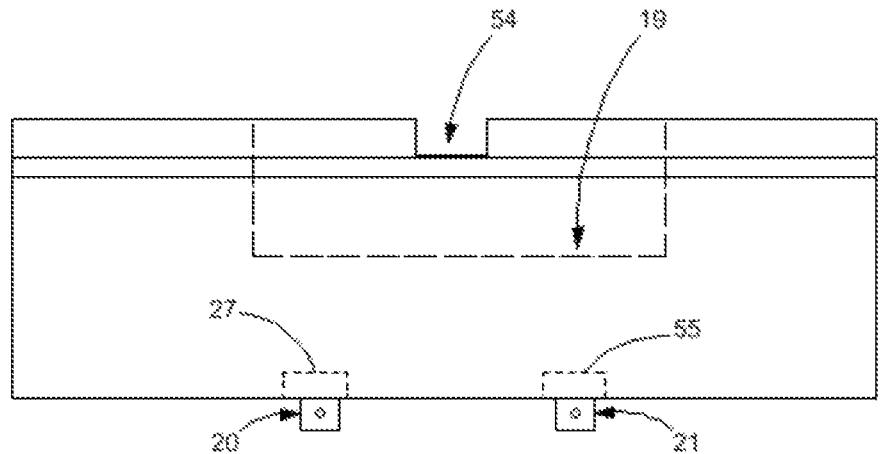
FIG. 8 shows a top view of certain embodiments of the present invention.

FIG. 8 shows a top view of container 11 including additional fasteners 20 and 21.

Figure 9:
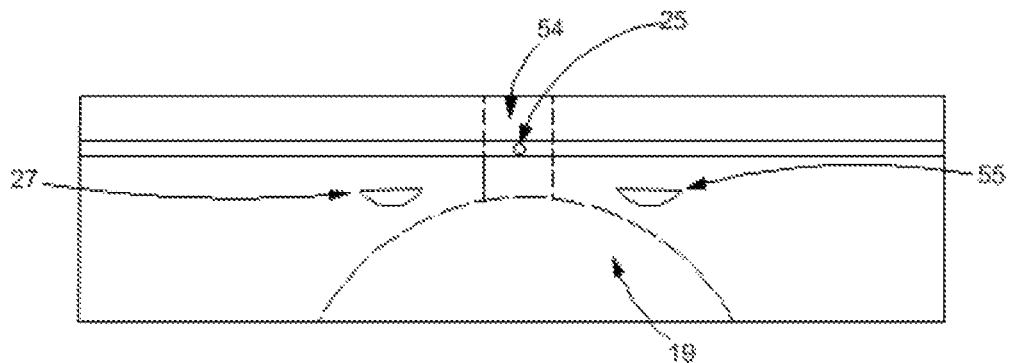
FIG. 9 shows a side view of certain embodiments of the present invention.

FIG. 9 shows a side view of the container 11 including grips 27 and 55 and a shaft 54.

Figure 10:
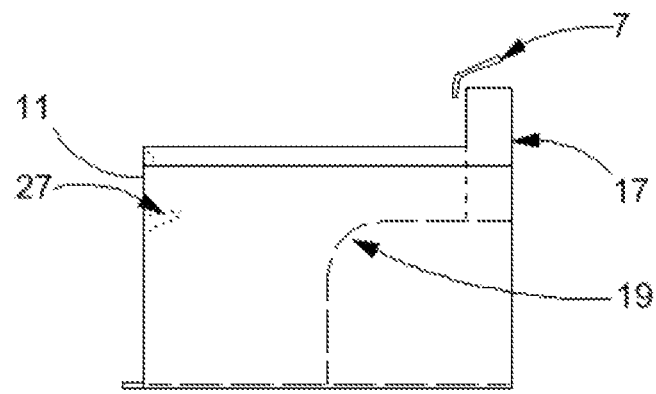
FIG. 10 shows a side view of alternative embodiments of the present invention mounted on the back of a pickup truck.

FIG. 10 shows a side view of container 11. Container 11 may include lip (7 or 8) that may engage with portion of side wall of the pickup truck to secure container 11.

Figure 11:
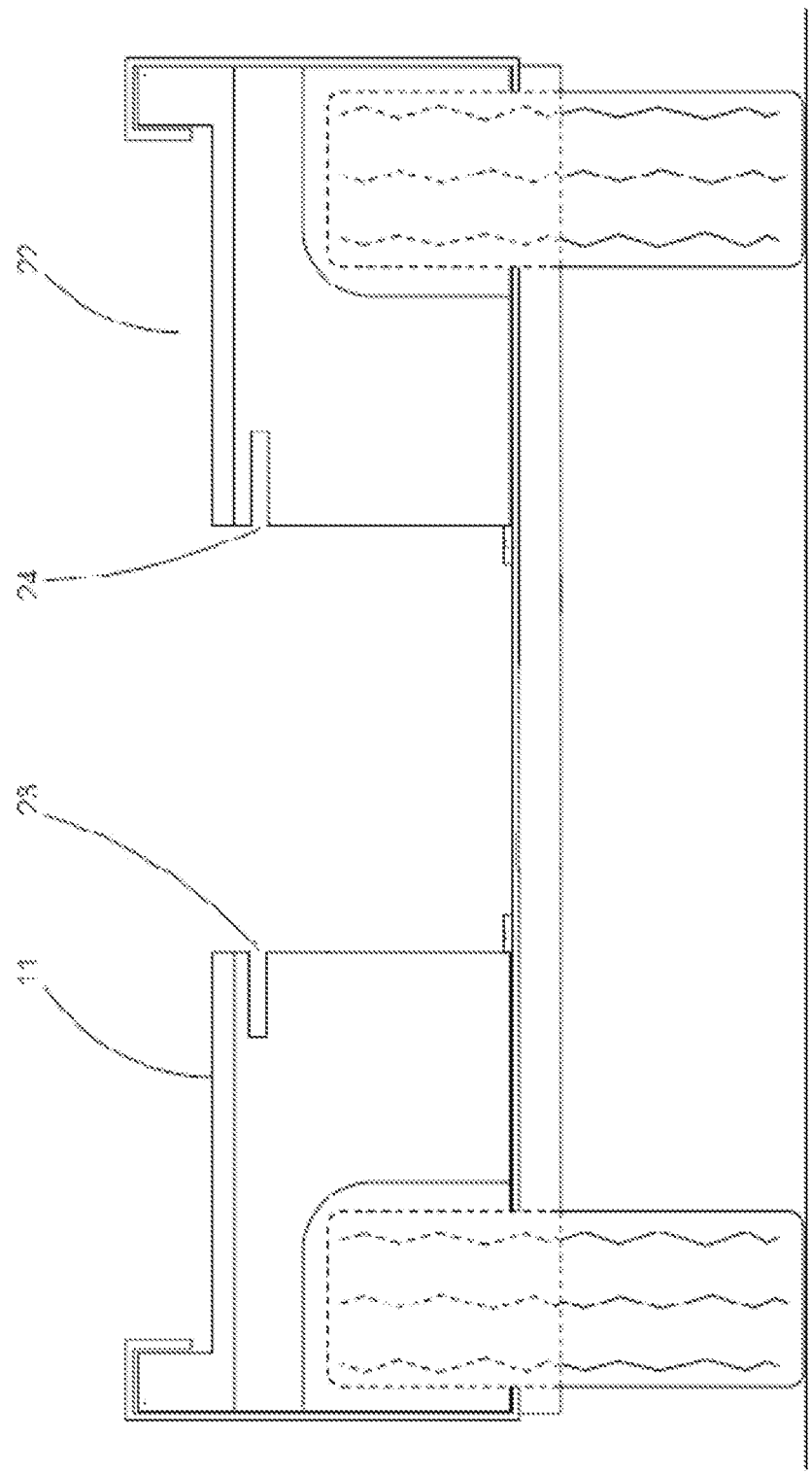
FIG. 11 shows a rear view of alternative embodiment of the present invention.
Figure 12:
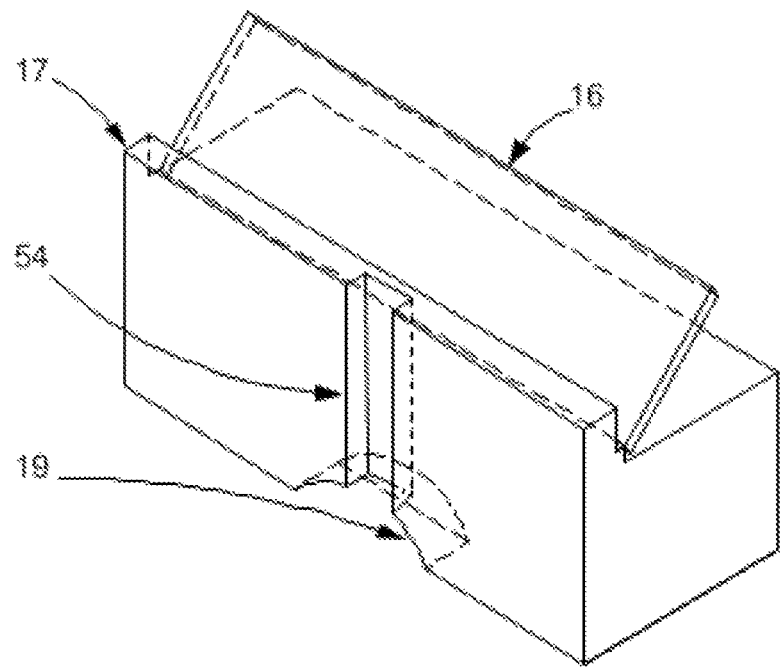
FIG. 12 shows a side view of alternative embodiment of the present invention.
Figure 13:
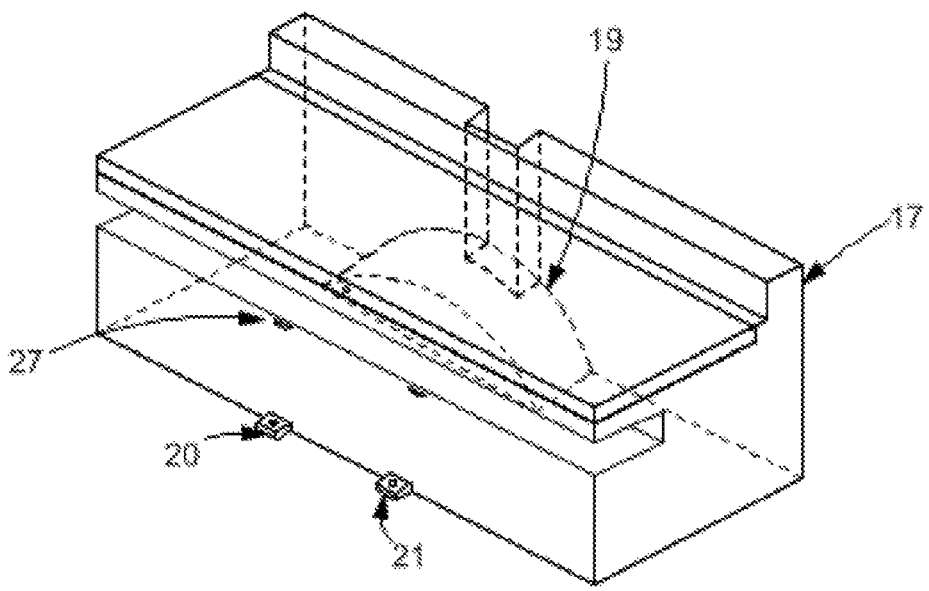
FIG. 13 shows an embodiment of the container of the present invention.
Figure 19:
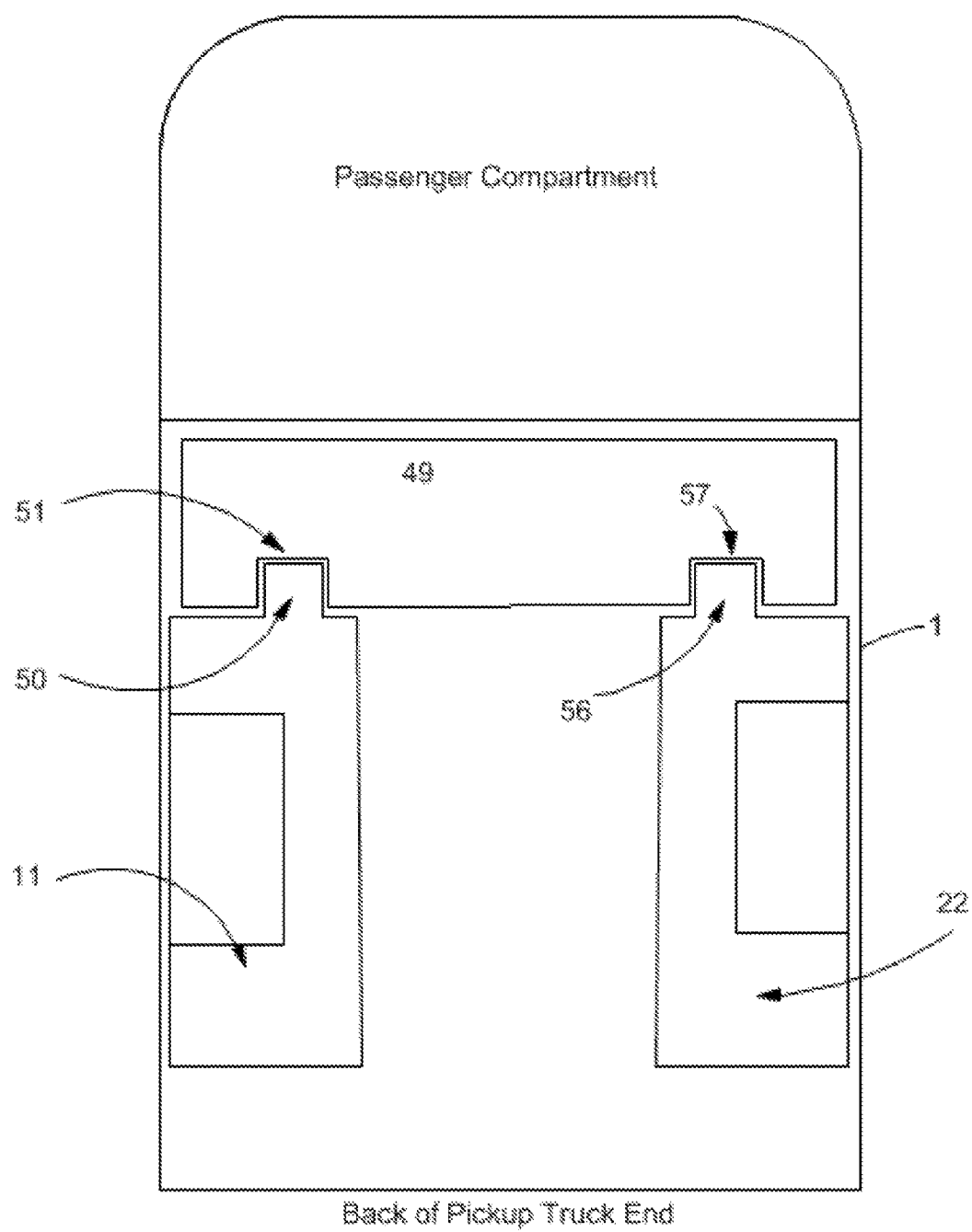
FIG. 19 shows a top view of an alternative embodiment of the present invention.
Figure 20:
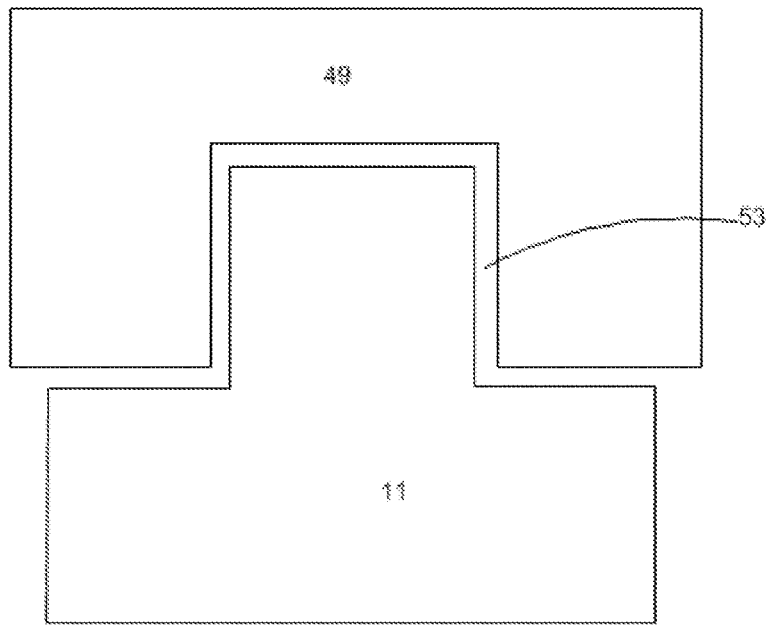
FIG. 20 shows a view of an alternative embodiment of the present invention.
Figure 21:
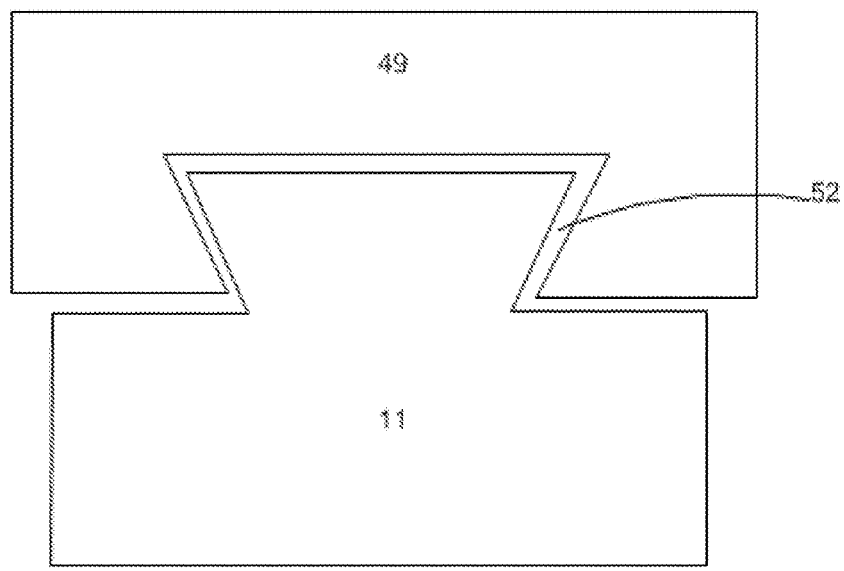
FIG. 21 shows a view of an alternative embodiment of the present invention.

FIG. 11 shows an alternative embodiment including a plurality of containers, 11 and 22. Container 11 may include a longitudinal cavity 23 and container 22 may include a longitudinal cavity 24. Containers 11 and 22 may be arranged in a variety of arrangements to utilize longitudinal cavities 23 and 24 for a variety of uses, such as securing layers or sheets between them.

A pickup truck comprises a back section called a flatbed 2. Said flatbed 2 may be covered by a covering called a tonneau. The sides of the pick up truck flatbed 2 contain a curved surface called a lip (7 or 8). The flatbed 2 of a pick up truck usually has two humps; a right hump 3 over the right tire 9 and a left hump 4 or the left tire 10. The hump (3 or 4), also called a wheel well, is a part of the flatbed 2 wherein said hump (3 or 4) is elevated, and usually round in shape, because the hump (3 or 4) must fit the pick up truck tire (9 or 10) which is underneath said hump (3 or 4).

In a preferred embodiment of the invention, a container 1 is added to the flatbed 2 of a pick up truck. Said container 11 is attachable to the lip (7 or 8) of the pick up truck by having an upper protrusion portion 17, of complementary shape to the lip (7 or 8), being placed under said lip (7 or 8). Said upper protrusion portion 17 is a part of said container 11. The bottom of said container 11 also has a cavity 19, which is of complementary shape to said hump (3 or 4). In one embodiment, said container 11 can be placed with said upper protrusion portion 17 underneath said lip (7 or 8), and with said cavity 19 over the hump (3 or 4), such that the container 11 is securely attached to the pick up truck. In one embodiment, the placement of said upper protrusion portion 17 under said lip (7 or 8), as well as the placement of said cavity 19 over said hump (3 or 4), is sufficient to secure, or to substantially secure, said container 11 to the pick up truck. In one embodiment, the container 11 does not need to be welded, glued, or otherwise permanently attached to said pick up truck, yet may still be securely attached to said pickup truck. In another embodiment, the container 11 may be welded, glued, or otherwise permanently attached to said pick up truck. In one further embodiment, the container 11 is capable of having a tonneau placed over said pick up truck bed.

In some pickup trucks, a portion of the pick up truck wall, above the hump (3 or 4), may extend outward from the side wall (5 or 6). In one embodiment, said container may include a shaft 54 above said hump (3 or 4) in order to fit said extending portion of the side wall. In one embodiment, said shaft 54 may have a complementary shape with said side wall (5 or 6).

In one embodiment, a person may attach the container 11 by taking the following steps: 1.) Stepping on to the flatbed 2 of the pick up truck with the container 11 in his or her hands; 2.) Placing the upper protrusion portion 17 just under the lip (7 or 8) while he or she holds the bottom of the container 11 which is angled away and not yet on the flatbed 2 of the pickup truck. 3.) Sliding the upper protrusion portion 17 up into the lip (7 or 8) while placing the bottom of the container 11 on the flatbed 2 so that the cavity 19 is over the hump (3 or 4). In this embodiment, the container 11 is now securely, or substantially securely, attached to the pick up truck. This is, in part, due to the fact that the lip (7 or 8) is covering the upper protrusion portion 17 and stopping, or substantially reducing, side to side motion and due to the fact that the cavity 19 is covering the hump (3 or 4) and stopping, or substantially reducing, front to back motion. 4.) In one embodiment, said container 11 has at least one fastener 20, such as a mounting tab extending from the bottom of the container 11 in a direction which is parallel to the flatbed 2. The driver may further secure the container 11 by using a screw gun to screw through said mounting tab, or tabs, and into the flatbed 2. In one embodiment, bolts may be used in lieu of screws. Various automobile manufacturers sell special security tire bolts which can only be handled with a tool of complementary shape. In one embodiment, said bolts are special security bolts which can only be handled by a tool of complementary shape. 5.) In one embodiment, the driver may place a tonneau over the back of the pick up truck. The container 11 will fit under said tonneau. 6.) In one embodiment, said container 11 is removable. The driver may remove said container 11 by reversing the above steps.

In one embodiment, said container 11 has a pivoting top cover, also called a lid, 16, which can be opened to provide access to the inside of the container 11. In one embodiment said lid 16 is at the top of said container 11. In one embodiment, said container (11 or 22) comprises a button 25 by which said lid 16 can be opened. In another embodiment, said container 11 contains a lock by which the lid 16 can be locked; said lock 16 may be a key lock, combination lock, pad lock, or another type of lock known in the art.

In one embodiment, said container 11, comprises a left grip 27 and a right grip 55 by which a person may hold said container 11. Said grips (27 and 55) may be used in installation and removal of said container 11. In one embodiment, said grips (27 and 55) are indentations. In another embodiment, said grips extend outward from the box.

In one embodiment, said container 11 contains at least one fastener or attachment 20 by which said container 11 can be secured to the flatbed 2. In one embodiment said fastener or attachment 20 is a mounting tab. In another embodiment, there are a plurality of said fasteners or attachments (20 and 21), including mounting tabs, by which said container 11 can be secured to the flatbed 2. In one embodiment, there are two said mounting tabs (20 and 21). In one embodiment, said tool box can be secured to the flatbed 2 by placing a bolt or screw, including with a screw gun, through the mounting tab(s) (20 and 21) and into the flat bed 2. In one embodiment, the pick up truck may be manufactured with components that the mounting tab(s) (20 and 21) can be connected to in order to secure said container 11.

In one embodiment, the top 16 of said container 11, is inclined. In various embodiments, said container 11, or lid 16, may be inclined in a forward-back direction or a side to side direction. It may be inclined such that the front side 14 of the container or lid 16, has a higher elevation than the back side 15 of the container 11, or lid 16, or vice versa. It may be inclined such that the left side 13 of the container 11, or lid 16, has a higher elevation than the right side 12 of the container 11, or lid 16, or vice versa. In one embodiment, said container lid 16 is flat. In one embodiment, said container 11 is comprised such that a user may place flat sheets of material, including dry wall, onto said container top 16. In one embodiment, said container 11 is comprised such that a user may place flat sheets of material, including dry wall, windows, glass or doors, onto said container top 16, wherein said container top 16 is flat, inclined or both flat and inclined. In one embodiment said container top 16 comprises obstructions, on at least the end of the container top 16, which has the lowest elevation, such that said flat sheets of material do not slide off of the tool box top.

In one embodiment, said container 11 contains a longitudinal cavity 23 wherein flat sheets of material, including dry wall, may be fit inside said longitudinal cavity 23. In one embodiment, said container 11 contains a longitudinal cavity 23 wherein said a longitudinal cavity 23 is on the side of the container 11 which is closest to the center of said back of the pickup truck 1. (i.e. furthest from the wall of said pick up truck), said longitudinal cavity 23 is a straight line (or close to a straight line) and said longitudinal cavity 23 slants downward with the lowest point in said longitudinal cavity 23 being near the front of the pick up truck and the highest point in said longitudinal cavity 23 being near the back of the pick up truck 1. Said longitudinal cavity 23 is capable of fitting flat sheets of material, including dry wall, inside said longitudinal cavity 23.

In one embodiment, there are two containers (11 and 22) on each side of the back of the pick up truck. Each of said containers contains a longitudinal cavity (23 or 24) wherein said longitudinal cavity (23 or 24) is on the side of the container which is closest to the center of said back of the pick up truck 1 (i.e. furthest from the walls (5 or 6) of said pick up back 1). In said embodiment, a user is capable of fitting flat sheets of material, including dry wall, inside said longitudinal cavities (23 and 24), with one side of the flat material being within the longitudinal cavity 23 of one of the containers 11 and the other side of said flat material being within the longitudinal cavity 24 of the other one of the container 22. In a further embodiment, said longitudinal cavities (23 and 24) slant downward with the lowest point of each said longitudinal cavity (23 or 24) being near the front of the pick up truck and the highest point of each said longitudinal cavity (23 or 24) being near the back of the pick up truck; and vice versa in another embodiment.

There are circumstances where the driver of a pick up truck may wish to increase the weight of the pick up truck; for example in storm or winter conditions, when a lower center of mass would make said pick up truck more stable. Two wheel drive pick up trucks may benefit from a lower center of mass during bad weather conditions. Drivers of said pick up trucks would benefit from more weight (and therefore more stability) during bad weather conditions and benefit from less weight (and therefore better fuel efficiency) during good weather conditions. In one embodiment, said container 11 may comprise materials 43 which are added to increase the weight of said tool box. In one embodiment, part of the container comprises material 43 which increases the weight of said container. In one embodiment, the material 43, which increases the weight of said container, is built into said container 11. In one embodiment, there is a second box 44 which is specially fitted to fit into said container 11. In one embodiment, said second box 44 is made of heavy material. In one embodiment, said second box 44 is made so that said second box 44 can be filled with heavy material 43. In one embodiment, said heavy material 43 is sand, or bags of sand. In one embodiment, said second box 44 can be opened and closed so that material 43 can be placed within it 44 or removed from it 44. In one embodiment, said second box 44 is shaped so that it fits into the bottom of the container 11 and said second box 44 has a flat top surface on which other items can be placed. In one embodiment, the container 11 contains smaller compartments within it.

More than one container (11 or 22) may be placed onto the flatbed 2 of the pick up truck. In one embodiment, one container 11 is placed on the left side of the flatbed 2 and another container 22 is placed on the right side of the flatbed 2.

In one embodiment, said container 11 further comprises at least one fastener or attachment 20.

In embodiment, said container 11 includes a plurality of tie downs to anchor items that are being hauled. In one embodiment, there are four tie downs; one tied down in each of the four corners of the interior side of said container. Rope, or other cords of any material, may be secured to said tie downs. A person may use said tie downs to securely attach with rope, items such as furniture, in the flatbed 2 of the pick up truck.

Said tie down, may be any structure known in the art to which a rope (or other cord) may be attached, including a knob, an aperture, or an islet.

In one embodiment, said container has a drainage plug 36, so that liquids that spill into said tool box may be drained out of the tool box and out of the flatbed 2 of the pickup truck.

In one embodiment, said container 11 may be made of any material, including plastic or recycled plastic. A feature of some embodiments in which the container 11 is made of flexible material, such as plastic, is that the material is more flexible and easier to slip the upper protrusion portion 17 into the lip (7 or 8) and the cavity 19 over the hump (3 or 4).

In one embodiment, the container 11 may further comprise a means 45 to increase the pressure between the lip (7 or 8) and the protrusion portion 17, and therefore more securely attach the container 11 to the pick up truck. This means 45 to increase pressure may include a wedge 46, v-shaped wedge 47, a ratchet 48, or other object which is placed between the lip (7 or 8) and the protrusion portion 17.

One embodiment comprises a container 11 on the left side of flatbed 2, over the left hump 4 (the "left side container" 11); a container on the right side of flatbed 2, over the right hump 3 (the "right side container" 22); and a container 49 in the front of the flatbed 2 (the "front container" 49). The front container 49 is not over a hump (3 or 4) but is in the front part of the flatbed 2. When the left side container 11, the right side container 22, and the front container 49 are installed in a flatbed 2, a person may climb on to the center of the flat bed 2 and access tools from either the two side containers (11 or 22) or the front container 49. In a further embodiment, the front container 49 is capable of being secured in place by mechanical pressure from the left side container 11, the right side container 22, and from the body of the truck. In a further embodiment, the front container 49 is capable of being secured in place by a protrusion 50 and a recess 51. Said three container system may have at least one protrusion 50 and at least one recess 51. It may have a plurality of protrusions (50 or 56) and recesses (51 or 57). Said protrusion 50 and said recess 51 have complementary shapes such that said protrusion 50 is capable of fitting tightly into said recess 51. In one embodiment, the protrusion 50 and recess 51 are such that a person may pick up the front container 49, place the protrusion 50 into the recess 51, and then slide down the front container 49 until the front container 49 touches the flatbed 2, the protrusion 50 is surrounded by the recess 51 for the entire depth of the protrusion 50, and the front container 49 is secured in place. In one embodiment, the left side container 11, or the right side container 22, may contain protrusions 50, and the front container 49 may contain at least one recesses 51; or vice versa. In various embodiments, the protrusion 50 and recess 51 may be of any shape or design including a Dovetail 52 or a Tongue in Groove 53. In various embodiments, said front container 49 may be welded, glued, or otherwise permanently attached to the flatbed 2; said front container 49 may also be secured by fasteners, including mounting tabs, in the same manner as other containers (11 or 22) described above.

In one embodiment, said container (11, 22 or 49) has, or approximates, the shape and dimension shown in the attached figures. Said shapes and dimensions, however, are not limitations on other embodiments of the invention.

In various embodiments, the "tool box" or "container" 11 described in this patent application need not be a tool box but may be any container which may be used for any purpose.

The word "exemplary" is used herein to mean "serving as an example, instance, or illustration." Any embodiment or variant described herein as "exemplary" is not necessarily to be construed as preferred or advantageous over other embodiments or variants. All of the embodiments and variants described in this description are exemplary embodiments and variants provided to enable persons skilled in the art to make and use the invention, and not necessarily to limit the scope of legal protection afforded the appended claims.

The above description of the disclosed embodiments is provided to enable any person skilled in the art to make or use that which is defined by the appended claims. The following claims are not intended to be limited to the disclosed embodiments. Other embodiments and modifications will readily occur to those of ordinary skill in the art in view of these teachings. Therefore, the following claims are intended to cover all such embodiments and modifications when viewed in conjunction with the above specification and accompanying drawings.

The various described embodiments may be separate embodiments, or two or more embodiments may be combined together.

What is claimed is:

1. A structure container system configured to be releasably mounted to the back of a vehicle,
    comprising a container having
        a rectangular enclosure comprising of top, bottom, front, rear, first side, and second side surfaces, wherein the top surface comprises of a pivoted lid and an upper protrusion portion, wherein the upper protrusion portion extends perpendicularly from the top surface and wherein the upper protrusion portion is bordered by the rectangular enclosure's rear surface, the pivoted lid's pivot point and the side surfaces;
        a hump shaped cavity below the top surface and contiguous with the bottom surface, the cavity being configured to be substantially conforming in shape with a wheel well of the vehicle;
        storage space within the enclosure;
        an object between a lip of the vehicle and the upper protrusion portion to increase pressure between the lip and the protrusion portion to secure the container to the vehicle without use of additional tools or structures.

2. The container system of claim 1, further comprising of a longitudinal cavity below the top surface extending along the front surface from the first side surface to the second side surface of the container.

3. The container system of claim 2, wherein the longitudinal cavity is inclined and wherein the lowest point of the longitudinal cavity is closer to the front of the vehicle and the highest point of the longitudinal cavity is closer to the rear of the vehicle.

4. The container system of claim 1, wherein the upper protrusion portion is configured to secure the container by way of its engagement with a channel guide of the vehicle.

5. The container system of claim 4, wherein the upper protrusion portion is complementary in shape with the channel guide of the vehicle.

6. The container system of claim 1 further comprising at least one fastener for securing the container with the vehicle.

7. The container system of claim 1, wherein the cavity is complementary in shape with the wheel well of the vehicle.

8. The container system of claim 1, further comprising a shaft configured to fit the container with an extending portion of a side wall of the vehicle.

9. The container system of claim 8, wherein the shaft has a complimentary shape with the side wall of the vehicle.

10. The container system of claim 1, further comprising of at least one grip on the front surface of the container.

11. The container system of claim 1, further comprising of a button for opening the lid.

12. The container system of claim 1, wherein the lid is inclined.

13. The container system of claim 1, further comprising an interior compartment for placing heavy materials for increasing the weight of the vehicle.

14. The container system of claim 1, further comprising a plurality of tie-downs.

15. A system of vehicle containers, comprising of first and second structure containers, located opposite each other on either side of the vehicle, above each wheel well of the vehicle, each of the first and second containers comprising of a rectangular enclosure comprising of top, bottom, front, rear, first side, and second side surfaces, wherein each top surface comprises a lid and an upper protrusion portion, wherein each upper protrusion portion extends perpendicularly from its respective top surface and wherein each upper protrusion portion is bordered by each rectangular enclosure's rear surface, wherein each of the first and second containers further comprises of a hump shaped cavity below each respective top surface, the cavity being configured to be substantially conforming in shape with each respective wheel well of the pickup truck above which each of the first and second containers are located, wherein each of the first and second containers further comprises of at least one protrusion extending from each respective first side surface of each enclosure, wherein each first side surface of each of the first and second containers is the surface facing and closest to the vehicle; and a center structure container, positioned perpendicular to each first side of each of the first and second containers, the center container comprising of a rectangular enclosure comprising of top, bottom, front, rear, first side and second side surfaces, wherein the top surface comprises of a lid, wherein the front surface of the center container faces the first side of each of the first and second containers and wherein the front surface comprises of at least two recesses, wherein each of the at least two recesses is configured to receive the at least one protrusion of each of the first and second structure containers and wherein the rear surface of the center container abuts the vehicle cab.

16. The system of claim 15, wherein each of the first and second containers comprises of a longitudinal cavity below each respective top surface extending along the front surface of each of the first and second containers from each respective first side surface to the respective second side surface of each of the first and second containers.

17. The system of claim 15, wherein the center container comprises of a longitudinal cavity extending along the front surface of the container.

18. The system of claim 15, wherein the upper protrusion portion of each of the first and second containers is configured to secure each respective container by way of its engagement with a channel guide of the vehicle.

19. The system of claim 15, further comprising at least one fastener for securing the containers with the vehicle.

20. The system of claim 15, wherein each cavity of the first and second containers is complementary in shape with each respective wheel well of the vehicle.

21. The system of claim 15, wherein each of the first and second containers comprises each of a shaft configured to fit each container with an extending portion of a side wall of the vehicle.

22. The system of claim 15, wherein each of the first, second and center containers comprises of at least one grip on the front surface of each respective container.

23. The system of claim 15, further comprising a plurality of tie-downs.

24. The system of claim 15, wherein each of the first, second and center containers comprise of a storage compartment.

* * * * *